(12) United States Patent
Yoshida

(10) Patent No.: US 9,233,870 B2
(45) Date of Patent: Jan. 12, 2016

(54) METHOD OF FABRICATING OPTICAL FIBER PREFORM

(75) Inventor: Makoto Yoshida, Kumisu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 1193 days.

(21) Appl. No.: 12/394,502

(22) Filed: Feb. 27, 2009

(65) Prior Publication Data

US 2009/0211300 A1 Aug. 27, 2009

(30) Foreign Application Priority Data

Feb. 27, 2008 (JP) .................................. 2008-046843
Feb. 5, 2009 (JP) .................................. 2009-025195

(51) Int. Cl.
*C03B 37/014* (2006.01)

(52) U.S. Cl.
CPC ......... *C03B 37/0142* (2013.01); *C03B 2207/06* (2013.01); *C03B 2207/12* (2013.01); *C03B 2207/14* (2013.01); *C03B 2207/20* (2013.01); *C03B 2207/62* (2013.01)

(58) Field of Classification Search
USPC ........................................... 65/382, 421, 491
See application file for complete search history.

(56) References Cited

U.S. PATENT DOCUMENTS

| | | | |
|---|---|---|---|
| 4,731,103 A * | 3/1988 | Mizutani et al. | ................ 65/378 |
| 4,810,189 A | 3/1989 | Mikami et al. | |
| 6,334,339 B1 | 1/2002 | Kanao et al. | |
| 2004/0182114 A1* | 9/2004 | Ooishi et al. | .................... 65/413 |
| 2007/0089461 A1* | 4/2007 | Hayami et al. | ................. 65/377 |

FOREIGN PATENT DOCUMENTS

| | | |
|---|---|---|
| JP | 62-187135 A | 8/1987 |
| JP | 5-323130 A | 12/1993 |
| JP | 10-101343 A | 4/1998 |
| JP | 2003-226544 A | 8/2003 |

OTHER PUBLICATIONS

English-language machine translation of Japanese Patent Application Publication JP2003-226544 downloaded from http://dossier1.ipdl.inpit.go.jp/AIPN/odse_top_dn.ipdl?N0000=7400 on Apr. 18, 2011.*
English Translation of JP2003226544(A). Aug. 2011.*
European Search Report dated May 4, 2009, issued in corresponding European Patent Application No. 09002894.5.

* cited by examiner

*Primary Examiner* — Lisa Herring
(74) *Attorney, Agent, or Firm* — Westerman, Hattori, Daniels & Adrian, LLP

(57) ABSTRACT

A method of fabricating an optical fiber preform that can give stable and high deposition efficiency from the start to the end of the deposition when synthesizing a large size preform. When fabricating a preform by hydrolyzing a glass raw material gas in flame to generate glass particles and depositing the glass particles on a rotating starting material in the radial direction using a burner with a concentric multiple-tube structure having at least a plurality of small diameter combustion assisting gas-ejecting ports having the same focal length. $L_1$ is made greater than $L_2$ ($L_1 > L_2$) during an early stage of deposition and $L_2$ is increased in the course of the deposition so that $L_2$ is greater than $L_1$ ($L_1 < L_2$), where the focal length is denoted by $L_1$ and the distance from the tip of the burner to a deposition plane on the starting material is denoted by $L_2$.

3 Claims, 4 Drawing Sheets

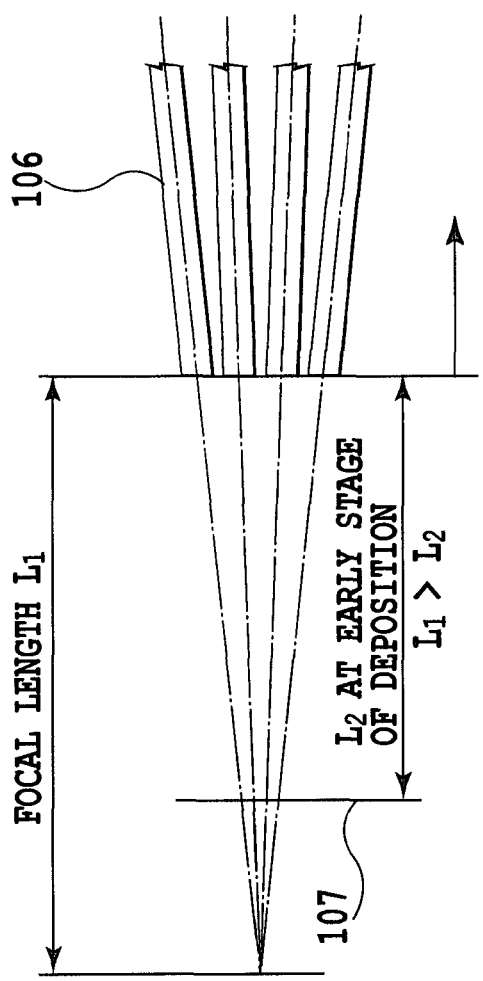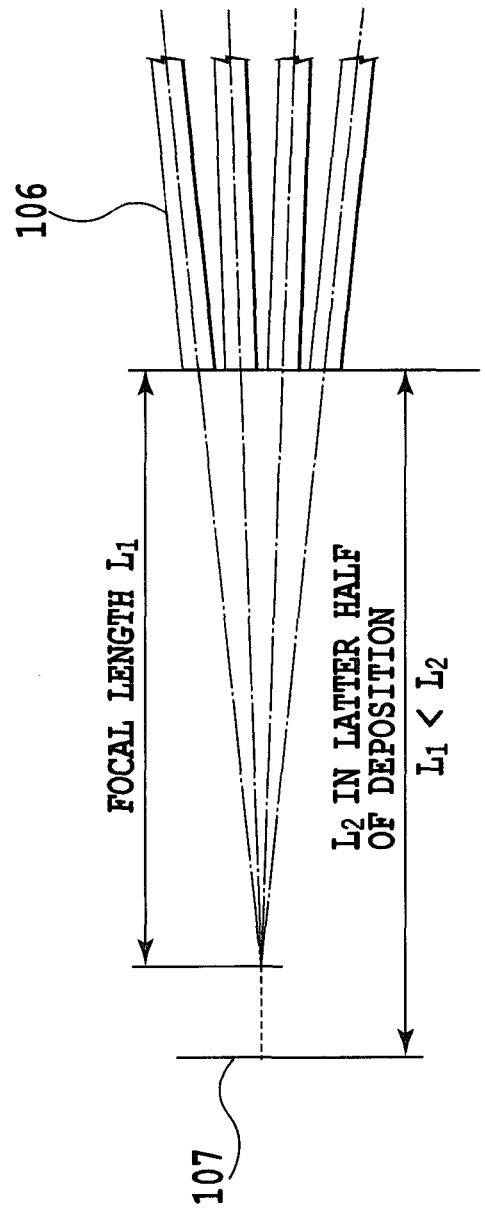
FIG.3A
FIG.3B

METHOD OF FABRICATING OPTICAL FIBER PREFORM

This application claims the benefit of Japanese Patent Application Nos. 2008-046843, filed Feb. 27, 2008, and 2009-025195, filed Feb. 5, 2009 which are hereby incorporated by reference herein in their entirety.

BACKGROUND OF THE INVENTION

1. Field of the Invention

The present invention relates to a method of fabricating an optical fiber preform by hydrolyzing a glass raw material gas in flame to generate glass particles, and depositing the particles on a rotating starting material.

2. Description of the Related Art

Up until now, various methods have been proposed for manufacturing optical fiber preforms. Among these methods is an Outside Vapor Phase Deposition Method (OVD method). In this method, glass particles generated by a burner flame are deposited and adhered on a rotating starting material while relatively reciprocating the burner or the starting material to synthesize a porous preform. The preform is desiccated and sintered in an electric furnace. The foregoing method has been widely used because the method can provide an optical fiber perform having a relatively arbitrary refractive index distribution and can mass-produce preforms having a large diameter.

FIG. 1 shows an outline of one example of an apparatus for fabricating an optical fiber preform. In the drawing, a starting material, on which glass particles (soot) are deposited, is constituted by welding a dummy rod 2 at both ends of a core rod 1, and both ends are supported by an ingot chuck mechanism 4 so as to be rotatable about an axis thereof. A freely movable burner 3 is arranged in the direction of the starting material. Vapor of an optical fiber source material such as $SiCl_4$ and combustion gas (hydrogen gas and oxygen gas) are blown from the movable burner to the starting material, and soot generated by the hydrolysis in an oxyhydrogen flame is deposited on the starting material to form a porous optical fiber preform. Reference numeral 5 represents an exhaust hood.

The burner 3 is supported by a burner guide mechanism (not shown) so as to be reciprocal in a longitudinal direction of the starting material and retractable from the starting material, and ejects a flame towards the starting material rotating about the axis. By depositing glass particles generated by the hydrolysis of the source material gas in the flame, a porous preform is fabricated. Next, by passing the porous preform through a heater portion of a heating furnace (not shown), it is desiccated and vitrified to become an optical fiber preform.

For synthesizing glass particles and depositing soot (glass particles) on a starting material, a concentric multiple tube burner has been conventionally used. However, the burner having such structure can not sufficiently mix a glass raw material gas, a flammable or burnable gas and a combustion assisting gas to generate a sufficient amount of glass particles. As a result, the manufacturing yield has not been improved and it has been difficult to achieve a high-speed synthesis.

In order to solve the problem, Japanese Patent No. 1773359 has proposed a multi-nozzle type burner, in which a plurality of small diameter combustion assisting gas-ejecting ports (hereinafter, referred to as small diameter ejecting ports) are arranged in a burnable gas-ejecting port so as to surround the central source material gas-ejecting port.

Further, Japanese Patent No. 3543537 has proposed a method of preventing the disturbance of a source material gas flow, in which, when denoting the focal length of a plurality of small diameter ejecting ports by L1 and the distance from the tip of the small diameter ejecting port to the glass particle deposition plane of a preform by L2, it is proposed that L1 is larger than L2. Inversely, Japanese Patent Application Laying-Open No. 2003-226544 has disclosed that the deposition efficiency can be improved by making L1 smaller than L2 to enhance the mixing efficiency of the gas.

However, in the OVD method, in which glass particles generated in a burner flame are deposited and adhered onto a rotating starting material while causing the burner or the starting material to relatively reciprocate, the weight of the preform increases and the diameter of a deposited body increases as the deposition progresses. Accordingly, as the deposition progress, the gas amount is usually increased to adjust the density of the deposited body. The deposition is continued until a starting material having an initial diameter of 50 mm attains a diameter of 300 mm.

During an early stage of deposition, since the deposition area is small, the deposition is performed at a small linear velocity of gas with a small amount of gas supplied. Consequently, the flow of glass particles is easily disturbed by gas ejected from the small diameter ejecting ports, and the disturbance decreases the deposition efficiency. In the second half of deposition, since the deposited body has an increased diameter and the deposition area has increased, the deposition is performed at a large linear velocity of gas with an increased amount of gas supplied. As a result, although the disturbance of the flow of glass particles by gas ejected from the small diameter ejecting ports is small, there is a problem that a large linear velocity of gas reduces the mixing ratio of gases and thus the deposition efficiency is decreased.

SUMMARY OF THE INVENTION

An object of the present invention is to solve the aforementioned problem and to provide a method capable of effectively performing the generation and the deposition of glass particles. In particular, the invention relates to a method of fabricating an optical fiber preform that can provide a stable and highly efficient deposition from the start to the end of the deposition upon synthesizing a large size preform.

According to a first aspect of the present invention, there is provided a method of fabricating an optical fiber preform, comprising:

using a burner having a concentric multiple-tube structure and having at least a glass raw material gas-ejecting port arranged at the center of the burner, a flammable gas ejecting port arranged outside the glass raw material gas-ejecting port, and a plurality of small diameter combustion assisting gas-ejecting ports arranged inside the flammable gas-ejecting port in at least one line on concentric circles relative to the glass raw material gas-ejecting port, the plurality of small diameter combustion assisting gas-ejecting ports arranged on the same line having the same focal length in a concentric fashion in such a way that the respective axes of the plurality of small diameter combustion assisting gas-ejecting ports focus at one point;

ejecting the glass raw material gas from the glass raw material gas-ejecting port;

ejecting a flammable gas from the flammable gas-ejecting port arranged outside the glass raw material gas-ejecting port;

ejecting a combustion assisting gas from the plurality of small diameter combustion assisting gas-ejecting ports;

hydrolyzing a glass raw material gas ejected from the glass raw material gas-ejecting port to generate glass particles;

depositing the glass particles on a rotating starting material in the radial direction, making $L_1$ greater than $L_2$ ($L_1 > L_2$) during the early stage of the deposition, where the focal length of the plurality of small diameter combustion assisting gas-ejecting ports is defined by $L_1$ and the distance from the tip of the plurality of small diameter combustion assisting gas-ejecting ports to a deposition plane of the glass particles on the starting material is defined by $L_2$; and making $L_2$ increased during the course of the deposition so that $L_2$ is greater than $L_1$ ($L_1 < L_2$).

According to a second aspect of the present invention, there is provided a method of fabricating an optical fiber preform wherein said burner is moved away from the deposition plane of the glass particles on the starting material so that the distance $L_2$ is made greater as an amount of deposition is increased to increase the outer diameter of the preform so as to achieve the relationship of $L_1 < L_2$ According to a third aspect of the present invention, there is provided a method of fabricating an optical fiber preform, wherein said burner is moved away from the deposition plane of the glass particles on the starting material so that a relationship L1=L2 is achieved when the outer diameter of the preform increases to substantially three times the diameter of the starting material.

The present invention provides extremely excellent effects in continuing deposition in a stable condition from start to the end with high deposition efficiency without causing rapid change in the density.

Further features of the present invention will become apparent from the following description of exemplary embodiments (with reference to the attached drawings).

BRIEF DESCRIPTION OF THE DRAWINGS

FIG. 3A is a drawing illustrating the relation between the focal length $L_1$ and the distance $L_2$ from the burner tip to the deposition plane during the early stage of the deposition;

FIG. 3B is a drawing illustrating the relation between the focal length $L_1$ and the distance $L_2$ from the burner tip to the deposition plane during the latter half of the deposition.

DESCRIPTION OF THE EMBODIMENTS

In order to achieve the above described object, the present inventor has found, as a result of the research, that it is important to properly set the relation between the focal length of small diameter ejecting ports and the distance from the tip of the ejecting ports to the deposition plane of glass particles during the early stage of the deposition and during the latter half of the deposition, respectively, and thus has achieved the present invention.

Figure 2A:
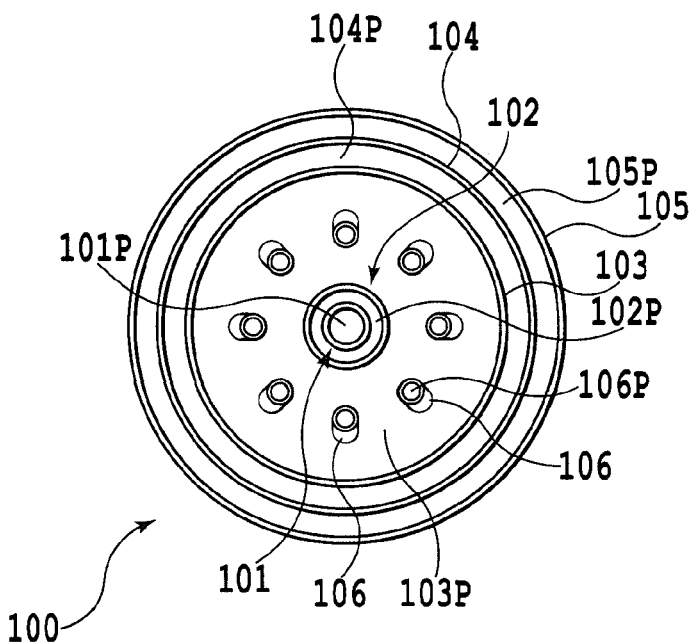
FIG. 2A is a schematic view showing the tip end of a burner for synthesizing glass particles, having the small diameter ejecting ports for use in the present invention.
Figure 2B:
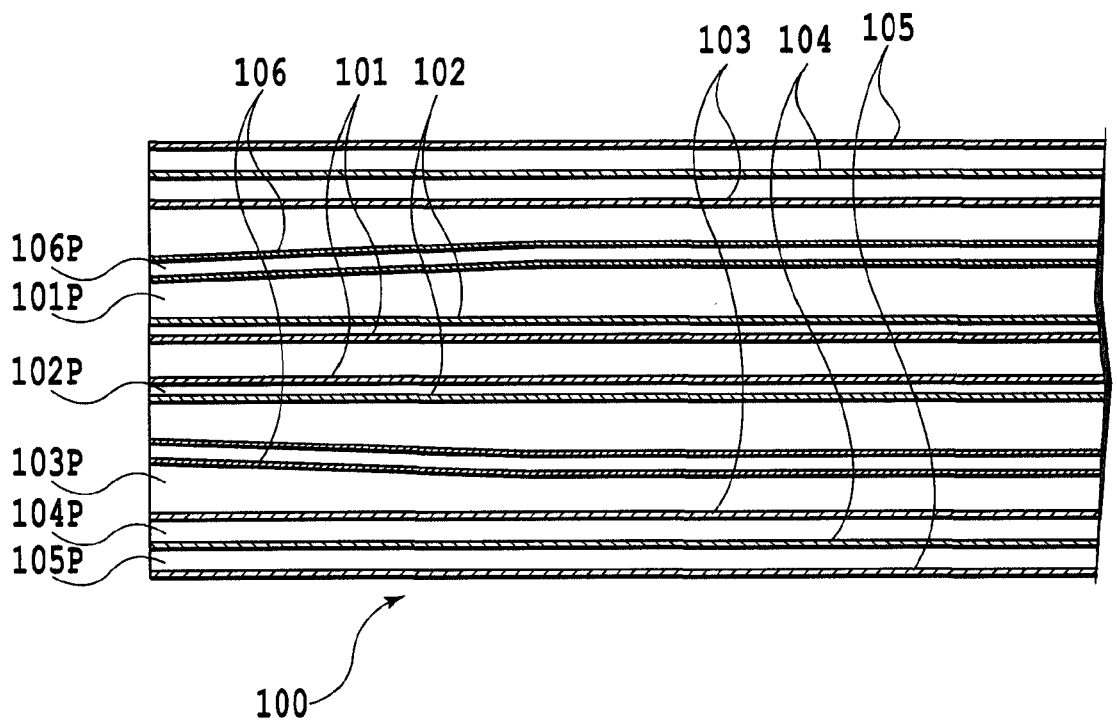
FIG. 2B is a cross-sectional view of the tip portion of the burner in FIG. 2A.

That is, in a burner shown in FIGS. 2A and 2B, as shown in FIGS. 3A and 3B, the focal length of a gas flow ejected from a plurality of small diameter ejecting nozzles 106 arranged in a concentric circle fashion in such a way that the respective axes of the nozzles 106 focus at one point is denoted by $L_1$.

The distance from the tip of the ejecting nozzles 106 to a glass particle deposition plane 107 is denoted by $L_2$. By setting $L_1 > L_2$ during the early stage of the deposition, during which the flow of glass particles may easily be disturbed by the combustion assisting gas ejected from the ejecting ports, it is possible to accelerate the mixing of the flammable gas with the combustion assisting gas in the outer side of the central flow without disturbing the central flow of glass particles. Thus, the deposition efficiency is increased.

In the present invention, the latter half of the deposition may be defined as a time period from the time that the diameter of a deposited body has grown to substantially three times that of the starting material.

By contrast, during the latter half deposition where the amount of gas and the linear velocity of the gas flow have been increased, the glass particle flow is hardly influenced by the combustion assisting gas flow ejected from the small diameter ejecting nozzles 106 and is hardly disturbed, but, on the other hand, the gas mixing efficiency is degraded. Therefore, by setting $L_1 < L_2$, the combustion assisting gas from the small diameter ejecting nozzles 106 intensively collides against the source material flame before colliding the deposited body at the focal position, to actively accelerate the mixing and reaction of the flammable gas, combustion assisting gas and glass particles. Thus, the deposition efficiency can be enhanced.

The adjustment of the focal length $L_1$ of the small diameter ejecting nozzles 106 is difficult during the deposition. Therefore, the adjustment of the relation between $L_1$ and $L_2$ can be practiced by adjusting the distance $L_2$ from the burner tip to the deposition plane. Specifically, from the early stage to the latter half of the deposition, by allowing the burner 100 to move smoothly off the deposition plane to increase the distance $L_2$, it is possible to make $L_1 < L_2$ and to continue the deposition in a stable state, without generating rapid density variation of the deposited preform.

Hereinafter, embodiments of the present invention will be described in more detail while referring to Examples and Comparative Examples, but the present invention is not limited to these.

Example 1

Figure 1:
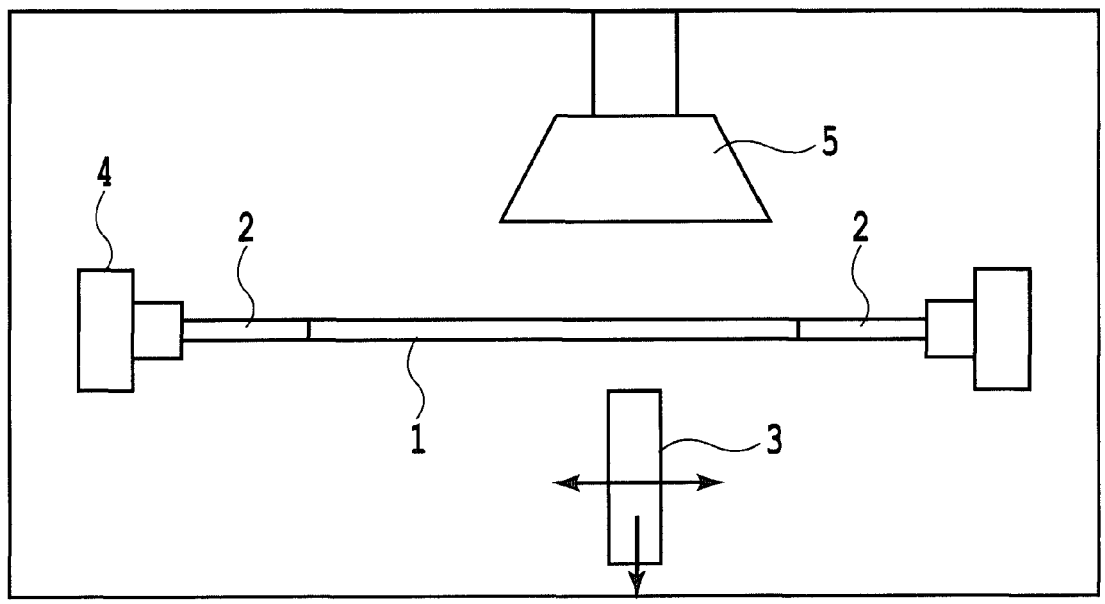
FIG. 1 is a schematic view showing an outline of an apparatus for manufacturing a porous glass preform by the Outside Vapor Phase Deposition Method (OVD method)

Using an apparatus as shown in FIG. 1 and by an OVD method, glass particles were deposited on a starting material. The starting material was formed by welding a dummy rod with an outer diameter of 50 mm to both ends of a core rod 1. The core rod 1 also had an outer diameter of 50 mm and a length of 2000 mm. The particles were deposited by the burner 100 having a concentric fivefold tube structure as shown in FIGS. 2A and 2B, so as to fabricate an optical fiber preform.

The burner 100 comprises a first tube 101 arranged at the center of the burner 100 to form a glass raw material gas-ejecting port 10P; a second tube 102 arranged outside the first tube 101 to form a seal gas-ejecting port 102P for ejecting a seal gas; and a third tube 103 arranged further outside the second tube 102 to form a flammable gas-ejecting port 103P for ejecting a flammable gas. The burner 100 also includes eight small diameter combustion assisting gas-ejecting port nozzles 106 contained in the flammable gas-ejecting port 103P between the second tube 102 and the third tube 103. The nozzles 106 are arranged on a concentric circle relative to the central glass raw material gas-ejecting port 101P in a line at equi-distant intervals, so as to form a small diameter combustion assisting gas-ejecting ports 106P for ejecting a combustion assisting gas and having a focal length $L_1=150$ mm. That is, the nozzles 106P are arranged in a concentric fashion in such a way that the respective axes of the nozzles 106 focus at one point by bending the nozzles 106 as shown in FIGS. 2A and 2B. The burner 100 further includes a fourth tube 104 arranged outside the third tube 103 to form a seal gas-ejecting port 104P for ejecting a seal gas and a fifth tube 105 arranged outside the fourth tube 104 to form a combustion assisting gas-ejecting port 105P for ejecting a combustion assisting gas.

From the start of deposition to the end of the deposition, the respective gases were fed within respective ranges set forth below with feed rates of the gases gradually increased. That is, $SiCl_4$ was fed at 1.0 to 10 L/min as a glass raw material gas and 5 to 20 L/min of a combustion assisting gas $O_2$ was also fed to the first tube 101 of the burner; 4 to 6 L/min of a seal gas $N_2$ was fed to the second tube 102; 70 to 170 L/min of a flammable gas $H_2$ was fed to the third tube 103; 4 to 6 L/min of a seal gas $N_2$ was fed to the fourth tube 104; 20 to 50 L/min of a combustion assisting gas $O_2$ was fed to the fifth tube 105; and a further 5 to 20 L/min of $O_2$ as a combustion assisting gas was fed to a primary tube (not shown), from which the small diameter ejecting port nozzles 106 provided in the third tube 103 were branched off. One hundred (100) kg of glass particles were deposited on the starting material. The type and feed amount of the gas fed to the respective tubes of the burner are collectively listed in Table 1, including those in Comparative Examples 1 and 2.

TABLE 1

|  | TYPE OF GAS | FLOW AMOUNT (L/min) |
|---|---|---|
| FIRST TUBE 101 (glass raw material gas-ejecting port) | $SiCl_4$<br>$O_2$ | to 10<br>5 to 20 |
| SECOND TUBE 102 (seal gas-ejecting port) | SEAL GAS ($N_2$) | 4 to 6 |
| THIRD TUBE 103 (flammable gas-ejecting port) | $H_2$ | 70 to 170 |
| FOURTH TUBE 104 (seal gas-ejecting port) | SEAL GAS ($N_2$) | 4 to 6 |
| FIFTH TUBE 105 (combustion assisting gas-ejecting port) | $O_2$ | 20 to 50 |
| SMALL DIAMETER COMBUSTION ASSISTING GAS-EJECTING PORT NOZZLES 106 | $O_2$ | 5 to 20 |

TABLE 2

| Deposition weight (kg) | EXAMPLE 1 | | COMPARATIVE EXAMPLE 1 | | COMPARATIVE EXAMPLE 2 | |
|---|---|---|---|---|---|---|
|  | Distance L2 (mm) | Deposition rate (g/hr) | Distance L2 (mm) | Deposition rate (g/hr) | Distance L2 (mm) | Deposition rate (g/hr) |
| 0 | 125 | 850 | 125 | 870 | 175 | 550 |
| 10 | 130 | 1650 | 125 | 1670 | 175 | 1400 |
| 20 | 135 | 2230 | 125 | 2250 | 175 | 2110 |
| 30 | 141 | 2500 | 125 | 2510 | 175 | 2460 |
| 40 | 146 | 2680 | 125 | 2525 | 175 | 2660 |
| 50 | 151 | 2790 | 125 | 2535 | 175 | 2810 |
| 60 | 156 | 2850 | 125 | 2545 | 175 | 2850 |
| 70 | 161 | 2920 | 125 | 2580 | 175 | 2920 |
| 80 | 167 | 2950 | 125 | 2590 | 175 | 2930 |
| 90 | 172 | 2950 | 125 | 2598 | 175 | 2930 |
| 100 | 175 | 2950 | 125 | 2600 | 175 | 2930 |

Figure 4:
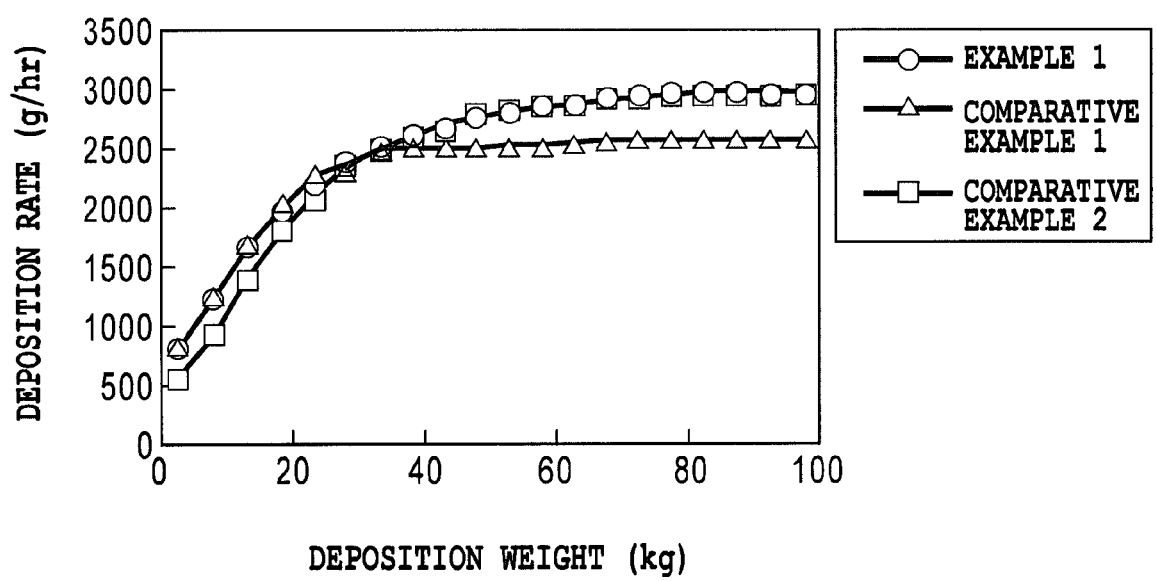
FIG. 4 is a graph illustrating the relation between deposition weight and deposition rate.

The deposition was started with the focal length of a plurality of small diameter ejecting ports 106P set to $L_1=150$ mm and the distance up to a deposition plane 107 set to $L_2=125$ mm. The burner was gradually moved away from the deposition plane as the deposited body is growing, so that $L_1$ was equal to $L_2$ at around the time that the diameter of the deposited body was 150 mm, which was substantially three times the diameter of the starting material, and $L_2$ was equal to 175 mm at the end of the deposition. Deposition rates with respect to representative values of deposition weight obtained as deposition results in Example 1 are collectively listed in Table 2, including results in Comparative Examples 1 and 2. Here, deposition efficiency of Example 1 and Comparative Examples 1 and 2 were 64.0%, 60.9% and 56.9%, respectively. Further, average deposition rates for every 5 kg of the deposition weight are shown in FIG. 4. From FIG. 4, it is recognized that the deposition rate in Example 1 is, during the deposition, superior to that in Comparative Examples 1 and 2 to be described later.

Comparative Example 1

One hundred (100) kg of glass particles were deposited on the starting material in the same way as in Example 1, except for performing the deposition with the focal length of the small diameter ejecting ports set to $L_1=150$ mm and maintaining the distance up to the deposition plane $L_2=125$ mm. From FIG. 4, the deposition rates were substantially the same as those in Example 1 at the early stage of the deposition, but were inferior to those in Example 1 during the latter half of the deposition.

Comparative Example 2

One hundred (100) kg of glass particles were deposited on the starting material in the same way as in Example 1, except for performing the deposition with the focal length of the small diameter ejecting ports set to $L_1=150$ mm and maintaining the distance up to the deposition plane $L_2=175$ mm.

From FIG. 4, the deposition rates were inferior to those in Example 1 during the early stage of the deposition, but were substantially the same as those in Example 1 in the latter half of the deposition.

According to the present invention, the deposition efficiency of glass particles is remarkably improved so as to improve the productivity of the porous glass preform.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A method of fabricating an optical fiber preform, comprising:

using a burner having a concentric multiple-tube structure and having at least a glass raw material gas-ejecting port arranged at the center of the burner, a flammable gas ejecting port arranged outside the glass raw material gas-ejecting port, and a plurality of small diameter combustion assisting gas-ejecting ports arranged inside the flammable gas-ejecting port in at least one line on concentric circles relative to the glass raw material gas-ejecting port, the plurality of small diameter combustion assisting gas-ejecting ports arranged on the same line having the same focal length in a concentric fashion in such a way that the respective axes of the plurality of small diameter combustion assisting gas-ejecting ports focus at one point;

ejecting a glass raw material from the glass raw material gas-ejecting port;

ejecting a flammable gas from the flammable gas-ejecting port arranged outside the glass raw material gas-ejecting port; ejecting a combustion assisting gas from the plurality of small diameter combustion assisting gas-ejecting ports;

hydrolyzing a glass raw material gas ejected from the glass raw material gas-ejecting port to generate glass particles;

depositing the glass particles on a rotating starting material in the radial direction;

increasing feed rates of the respective gases from the start of the deposition to the end of the deposition;

making $L_1$ greater than $L_2$ ($L_1 > L_2$) during the early stage of the deposition where a focal length of the plurality of small diameter combustion assisting gas-ejecting ports is defined by $L_1$ and a distance from the tip of the plurality of small diameter combustion assisting gas-ejecting ports to a deposition plane of the glass particles on the starting material is defined by $L_2$; and making $L_2$ increased during the course of the deposition so that $L_2$ is greater than $L_1$ ($L_1 < L_2$).

2. The method of fabricating an optical fiber preform according to claim 1, wherein said burner is moved away from the deposition plane of the glass particles on the starting material so that the distance $L_2$ is made greater as an amount of deposition is increased to increase an outer diameter of the preform so as to achieve the relationship of $L_1 < L_2$.

3. The method of fabricating an optical fiber preform according to claim 2, wherein said burner is moved away from the deposition plane of the glass particles on the starting material so that a relationship L1=L2 is achieved when the outer diameter of the preform increases to substantially three times the diameter of the starting material.

* * * * *